United States Patent Office 3,432,451
Patented Mar. 11, 1969

3,432,451
POLYOLEFIN-MODIFIED POLYURETHANES AND PROCESS OF MAKING SAME
Rene Kales, New York, N.Y., assignor to Hertz, Warner Affiliated Corp., New York, N.Y., a corporation of New York
No Drawing. Continuation-in-part of application Ser. No. 3,250, Jan. 19, 1960. This application Mar. 8, 1965, Ser. No. 438,077
U.S. Cl. 260—23
Int. Cl. C08f 21/04; C09d 3/60, 3/72
17 Claims

ABSTRACT OF THE DISCLOSURE

Polyolefin-modified polyurethanes are prepared by dissolving a polyolefin in a fatty acid ester having at least one free hydroxyl group, and reacting a polyisocyanate with the resulting solution. The modified polyurethanes are useful as surface coatings and adhesives.

---

The present invention is a continuation-in-part of copending application Serial No. 3,250, filed January 19, 1960, now abandoned, and entitled "Copolymerization Products of Polyalkylenes and Polyurethanes and Process of Making Same."

The present invention relates to new and valuable polyurethanes and more particularly to polyolefin-modified polyurethanes and to a process of making such products.

Polyurethane compositions have been known and used for a wide variety of purposes, for instance, as adhesives, as moldable compositions, as elastomers for coatings, as fibers, and others. Although their resistance to abrasion, their water absorption, and their resistance to chemical agents such as salts, alkalies, acids, and organic solvents, is quite high, it is not fully satisfactory. Therefore, many attempts have been made to improve polyurethanes and to make them more generally applicable. Another disadvantage of polyurethane compositions is the difficulty of combining them with large amounts of filler materials, such as sand, cement, wood flour, sawdust, pigments, and the like.

It is one object of the present invention to provide new and valuable polyolefin-modified polyurethanes and more particularly polyethylene-modified polyurethanes.

Another object of the present invention is to provide solutions of such polyolefin-modified polyurethanes and more particularly of polyethylene-modified polyurethanes which solutions can find application as protective coatings for many purposes for which heretofore polyolefins and especially polyethylene could not be used.

Still another object of the present invention is to provide new and highly effective high friction coatings which are useful, for instance, in providing highways and other road surfaces with an antiskidding surface, for hardening the surface of unpaved roads or areas and the like.

A further object of the present invention is to provide a simple and effective process of producing such valuable polyolefin-modified polyurethanes and their solutions.

A further object is to provide a new and highly effective bonding agent for bonding freshly prepared concrete to existing concrete surfaces.

Another object of the present invention is to provide a new and valuable building construction and patching material which can be mixed with any type of cement and can be used to repair concrete structures, masonry, and the like.

Another object of the present invention is to provide abrasive paper and cloths useful, for instance, for polishing metal parts and the like which abrasive material has a surprisingly high durability.

Another object of the present invention is to provide a valuable coating composition for electrical insulation yielding coatings of excellent hardness, elasticity, and abrasive resistance.

Another object of the present invention is to provide salt and fresh water-resistant coatings useful in protecting marine structures, boat hulls and decks, and the like.

Another object of the present invention is to provide a composition for the treatment of roof shingles whereby old or worn out shingles are not only sealed and rendered water-proof but also are straightened out and uncurled.

A further object of the present invention is to provide a superior bonding material for the bonding, for instance, of polyethylene or polypropylene to other materials, such as polyamides as they are sold under the trademarks "Nylon," "Dacron," and the like, to polymeric tetrafluoro ethylene, rubber, metal, and many other materials.

A further object of the present invention is to provide a bonding composition for making high-grade laminates of good resistance to vibration and excellent thermal and electrical insulating properties.

Still another object of the present invention is to provide a finishing coating for leather and synthetic leather which imparts to the treated leather high flexibility, resistance to cracking even at freezing temperatures, water resistance, gloss and other valuable properties.

Other objects of the present invention and advantageous features thereof will become apparent as the description proceeds.

In principle the present invention comprises the preparation of a novel and valuable polyolefin modified polyurethane product by (a) Heating a homopolymer of a mono-olefin or a polymer of a mixture of mono-olefins having two to four carbon atoms with a fatty acid ester having at least one free hydroxyl group in its molecule to a temperature of at least 80° C. and preferably to a temperature of at least 130° C. until the polyolefin is substantially completely dissolved, (b) Adding to the resulting cooled mixture a reactive polyurethane-forming polyisocyanate, if desired, with the addition of a diluting solvent, and (c) Maintaining the mixture at a temperature between about 40° C. and about 90° C. until polyurethane formation is completed, (d) Said polyurethane formation step being carried out in a substantially moisture-free atmosphere, preferably in an inert gas atmosphere.

According to an especially advantageous embodiment of the present invention the polyolefin-modified polyurethanes are obtained by first transesterifying a drying, semi-drying, or non-drying vegetable or animal oil, such as linseed oil, soybean oil, tall oil, China wood oil, fish oils, castor oil, Perilla oil, and others, with glycerol or other polyhydric alcohols such as polyalkylene glycols, for instance, diethylene glycol, dipropylene glycol, sorbitol, polypropylene glycols of a molecular weight between 400 and 2000, and their mono-ethers, with the addition of a polyolefin and especially of polyethylene. Said transesterification is effected in the presence of transesterification catalysts such as calcium naphthenate and the like in a substantially moisture-free atmosphere, preferably in an inert gas atmosphere by heating to a temperature between about 120° C. and about 500° C. and preferably at about 250° C. while stirring until transesterification is completed. Usually heating for two hours is sufficient to effect transesterification. Thereby, the polyolefin is completely dissolved in the resulting mixture. Transesterification serves to introduce reactive free hydroxyl groups into the fatty acid ester.

The fatty acid esters used in the process of this invention are esters of fatty acids having between fourteen and twenty-four carbon atoms.

The preferred fatty acid esters are the above-mentioned vegetable and animal oils.

After cooling, a reactive, polyurethane-forming polyisocyanate and especially an aromatic di-isocyanate such as 2,4-toluylene di-isocyanate, 1,4-phenylene di-isocyanate, 4,4'-diphenyl methane di-isocyanate, 4,4',4''-triphenyl methane di-isocyanate, 1,5-naphthylene di-isocyanate, mixtures of such poly-isocyanates such as the mixture of 80% of 2,4-toluylene di-isocyanate and 20% of 2,6-toluylene di-isocyanate, and others is gradually and slowly added to the polyalkylene fatty acid ester mixture while stirring and maintaining a moisture-free atmosphere, preferably an inert gas atmosphere in the reaction vessel.

Organic mono-isocyanates are also useful for the purpose of the present invention although the aromatic di-isocyanates are the preferred reactants. Such mono-isocyanates are, for instance, the dodecyl isocyanate, cyclohexyl isocyanate, phenyl isocyanate, tolyl isocyanate, chloro phenyl isocyanate, and others.

Suitable solvents may be added gradually during the addition of the poly-isocyanate compound in order to prevent solidification of the reaction mixture. Such solvents are, for instance, hydrocarbon solvents, such as mineral spirit, xylene, toluene, benzene, mixtures thereof, and the like. The addition of alcohols such as methanol, butanol, and others during the polyisocyanate addition has a stabilizing effect upon the final composition and increases its storage life. If necessary, the reaction mixture is heated to facilitate polycondensation and polymerization to oil-modified polyurethanes.

The resulting reaction product is a prepolymer which is capable of hardening, when applied to surfaces, by allowing it to stand, by heating, by the action of moisture or of actinic rays such as ultraviolet rays. Final hardening may be accelerated by the addition of suitable hardening catalysts shortly before use, such as cobalt naphthenate, lead naphthenate, and the like.

Two types of polyolefin-modified polyurethanes are prepared. The one type is composed in such a manner that it is applicable as coating. Thereby, hardening is effected by evaporation of the solvents. This type of product contains the polyurethane in condensed and polymerized form without free isocyanate groups.

The other type is composed in such a manner that there is an excess of free isocyanate groups present in the product. Such material hardens by reaction with hydroxyl groups, for instance, by exposure to moisture or, in many instances, by reaction with the surface of the materials to be joined. Heat, actinic rays, or catalysts accelerate hardening and bonding.

The important feature of the present invention is the possibility of incorporating polyolefins and especially polyethylene in amounts between about 2% and about 60% into the polyurethane. The resulting polyolefin-modified polyurethanes are superior in their properties to any of the known polyurethanes and modified polyurethanes as will become evident hereinafter.

Valuable products are obtained by adding other synthetic resins, such as alkyd resins, phenolformaldehyde resins, polyvinyl acetate, and copolymerization products thereof, chlorinated rubber, and others to the reaction mixture of the polyolefin in the fatty acid ester or transesterified oil and the polyisocyanate reactant. Plasticizers, such as dibutyl phthalate, and others may also be admixed, likewise antiskinning agents such as silicones, and the like.

The polyolefin employed and especially the polyethylene or polyproylene are preferably of relatively low molecular weight, for instance, of a molecular weight between about 1,500 and about 20,000 having a softening point of between about 88° C. and about 110° C. For coating compositions according to the present invention there is preferably used a polyethylene of a molecular weight between about 12,000 and about 19,000. Higher molecular polyethylenes up to a molecular weight of about 100,000 may also be used for the preparation of specific polyolefin-modified polyurethanes according to the present invention.

For coating purposes it is advisable to add the filler material to the mixture during reaction with the polyisocyanate. Fillers which are especially suitable for this purpose are finely comminuted metal powders, silica, cement, marble, and kaolin, these last two agents especially for imparting high heat resistance to the composition and others.

It is also possible to admix fillers shortly before use whereby the filler may react with excess polyisocyanate. Such fillers are, for instance, cement, broken concrete, brickwork, sand, gravel, sawdust, and the fillers mentioned hereinabove.

The resulting compositions are especially useful in repairing masonry, concrete and cement structures, as mortar material, as concrete pipe coatings and interior lining of such pipes, as flooring material, and especially as underlayers and for other purposes.

Excellent caulking and the like compositions are obtained by admixing tar, asphalt, and other bituminous materials.

The following examples serve to illustrate the present invention without, however, limiting the same thereto.

Example 1

68.0 g. of hard boiled linseed oil, 112.0 g. of polyethylene of the molecular weight 12,000, 30 g. of ethylene glycol, and 0.5 g. of calcium naphthenate are heated at 250° C. under nitrogen for two hours while stirring. Transesterification and dissolution of the polyethylene are completed as soon as the temperature starts to decrease. The polyethylene is completely dissolved. The resulting solution is cooled to 50° C.

41.0 g. of a mixture of 80% of 2,4-toluylene di-isocyanate and 20% of 2,6-toluylene di-isocyanate and, simultaneously, 221.5 g. of xylene are gradually and slowly added, while stirring, to said solution within about 30 minutes. Care must be taken that the temperature does not rise above a temperature of 60–65° C. The reaction mixture is cooled, if necessary. The viscosity of the resulting solution increases and heating at 60–65° C. is continued until the desired viscosity has been attained. The temperature of the solution is then reduced to 35–40° C. and 9.0 g. of methanol, 0.1 g. of cobalt naphthenate, 1.2 g. of lead naphthenate, and 0.5 g. of antiskinning agent are admixed. The resulting mixture is filled and kept in closed containers until used.

As antiskinning agent there may be added any of the known antiskinning agents such as the products sold under the trademarks "Anti-oxidant B," "Anti-oxidant D," or "National ASA." Chemically such antiskinning agents are secondary arylamines, for instance, N,N'-diphenyl-p-phenylene diamine, alkyl arylamines, for instance, N,N'-diphenyl-ethylene diamine, phosphite ester, alkylated phenol sulfides, or others.

Example 2

The procedure is the same as described hereinabove in Example 1, whereby, however, the following components are used.

(a) For transesterification at 250° C. in dry nitrogen for 2 hours:

|   | G. |
|---|---|
| Soybean oil | 57.0 |
| Glycerol | 20.5 |
| Polyethylene (molecular weight: 7,000) | 2.1 |
| Polyethylene glycol compound sold under the trademark "Polyether 15–100" | 18.5 |
| Calcium naphthenate | 0.5 |

(b) For formation of the polyolefin-modified polyurethane between 50° C. and 65° C.:

|  | G. |
|---|---|
| Mixture of 80% of 2,4-toluylene di-isocyanate and 20% of 2,6-toluylene di-isocyanate | 64.5 |
| Xylene | 220.5 |

Thereafter, the temperature of the reaction mixture is increased to 90° C. to complete the reaction and is then decreased to 55° C.

|  | G. |
|---|---|
| Methanol (as stabilizer) | 11.0 |
| Cobalt naphthenate | 0.15 |
| Lead naphthenate | 1.1 |
| Antiskinning agent | 0.4 | are admixed.

Example 3

The procedure is the same as described hereinabove in Example 1, whereby, however, the following components are used:

(a) Esterification of the following components is effected at 200° C. in dry nitrogen in a reaction vessel equipped with a condenser and a moisture trap for two hours while stirring.

|  | G. |
|---|---|
| Tall oil | 114.5 |
| Polyethylene glycol compound sold under the trademark "Polyether 15–100" | 17.0 |
| Polyethylene of the molecular weight 7,000 | 156.0 |
| Calcium naphthenate | 0.65 |

(b) For formation of the polyolefin-modified polyurethane between 50° C. and 85° C.:

|  | G. |
|---|---|
| The mixture of 80% of 2,4-toluylene di-isocyanate and 20% of 2,6-toluylene di-isocyanate | 54.8 |
| Mineral spirit, as solvent and diluting agent | 108.5 |

The mixture is stirred at 80–85° C. until the desired viscosity is attained. After cooling to 40° C., 0.2 g. of cobalt naphthenate, 1.7 g. of lead naphthenate, and 0.7 g. of antiskinning agent are added. The resulting solution is ready for use.

In place of the hard boiled linseed oil, soybean oil, and tall oil used in the preceding examples, there can be employed other oils such as castor oil and others and in place of glycerol and "Polyether 15–100" other polyhydric alcohols such as ethylene glycol, diethylene glycol, dipropylene glycon, sorbitol and others.

Transesterification may also be effected before the polyethylene is added and dissolution of the polyethylene takes place in the preformed transesterified oil.

It is also possible to directly dissolve the polyethylene in fatty acid compounds containing free hydroxyl groups such as the alkyl ricinoleates and acetylated alkyl ricinoleates sold under the trademark "Flexricin" and others. The following examples describe the solubilization of polyethylene in such fatty acid derivatives and the formation of polyethylene-modified polyurethanes therefrom.

In general, the procedure is the same as described in Example 1, i.e. the polyethylene is heated in the fatty acid compounds to about 250° C. until completely dissolved. Apparently a reaction between polyethylene and the fatty acid derivative takes place as is evident from the fact that the temperature of about 250° C. is maintained without external supply of heat. 10% of the solvents which are subsequently added with the isocyanate, are preferably added during the first reaction and dissolution step. The resulting polyethylene-fatty acid compound solution is then reacted with the di-isocyanate in the presence of the remainder of the solvents.

Example 4

(a) Preparation of the polyethylene solution:

|  | G. |
|---|---|
| The alkyl ricinoleate sold under the trademark "Flexricin 13" | 12.6 |
| Polyethylene sold under the trademark "Tenite 800" | 20.0 |
| Adipic acid as catalyst | 2.0 |
| Toluene | 4.0 |
| The solvent mixture sold under the trademark "Solveso 100" | 0.5 |

(b) Formation of the polyethylene-modified polyurethane:

|  | G. |
|---|---|
| Mixture of 80% of 2,4-toluylene di-isocyanate and 20% of 2,6-toluylene di-isocyanate | 17.4 |
| Toluene | 36.0 |
| Solvent mixture sold under the trademark "Solveso 100" | 4.5 |

After polyurethane formation is completed, 3.0 g. of methanol are added as stabilizer.

Example 5

(a) Preparation of the polyethylene solution:

|  | G. |
|---|---|
| The alkyl ricinoleate sold under the trademark "Flexricin 30" | 20.0 |
| Polyethylene sold under the trademark "Petrothene 210" | 20.0 |
| Toluene | 4.0 |
| Solvent mixture sold under the trademark "Solveso 100" | 0.3 |

(b) Formation of the polyethylene-modified polyurethane:

|  | G. |
|---|---|
| Mixture of 80% of 2,4-toluylene di-isocyanate and 20% of 2,6-toluylene di-isocyanate | 10.2 |
| Toluene | 36.0 |
| Solvent mixture sold under the trademark "Solveso 100" | 30.0 |

After polyurethane formation is completed, 7.0 g. of butanol are added as stabilizer.

In a similar manner there may be used, in place of the castor oil derivatives "Flexricin," the saturated fatty acid ester compositions such as the alkyl hydroxy stearates and acetoxy stearates sold under the trademark "Paricin." The following examples describe such polyethylene-modified polyurethane products whereby the procedure is in principle the same as described in Example 1.

Example 6

(a) Preparation of the polyethylene solution:

|  | G. |
|---|---|
| Alkyl hydroxy stearate sold under the trademark "Paricin 9" | 20.0 |
| Polyethylene sold under the trademark "Petrothene 100" | 15.0 |
| Mixture consisting of 10% of butanol, 10% of ethyl acetate, 30% of methyl glycol acetate, 15% of butyl acetate, 20% of toluene, and 15% of cresylic acid | 5.0 |

(b) Formation of the polyethylene-modified polyurethane:

|  | G. |
|---|---|
| Mixture of 80% of 2,4-toluylene di-isocyanate and 20% of 2,6-toluylene di-isocyanate | 15.0 |
| Mixture consisting of 10% of butanol, 10% of ethyl acetate, 15% of butyl acetate, 30% of methyl glycol acetate, 20% toluene, and 15% of cresylic acid | 45.0 |

The resulting solution of the modified polyurethane product is ready for use.

Example 7

(a) Preparation of the polyethylene solution:

|  | G. |
|---|---|
| Alkyl hydroxy stearate sold under the trademark "Paricin 13" | 13.0 |
| Polyethylene sold under the trademark "Tenite 859" | 21.0 |
| Xylene | 4.0 |
| Cresylic acid | 2.0 |

(b) Formation of the polyethylene-modified polyurethane:

|  | G. |
|---|---|
| Mixture of 80% of 2,4-toluylene di-isocyanate and 20% of 2,6-toluylene di-isocyanate | 16.0 |
| Xylene | 36.0 |
| Solvent mixture sold under the trademark "Solveso 100" | 3.0 |

After polyurethane formation is completed, 5.0 g. of methanol are added as stabilizer.

In place of the "Flexricin" compositions used in Examples 4 and 5 there may be used other "Flexricin" compositions, such as "Flexricin 17" which is a pentaerythritol monoricinoleate, "Flexricin 19" which is a pentaerythritol tetraricinoleate, "Flexricin 20" which is a polyethylene glycol 200 monoricinoleate and others. The plasticizer resulting from the complete oxidation of castor oil sold under the trademark "Polycin" and other castor oil esters sold under the trademark "Estinox" and other similar compositions may be used likewise.

Another suitable reaction component is the hydrogenated castor oil sold under the trademark "Castorwax" as will be shown in the following example which, in general, follows the procedure described hereinabove in Example 1.

Example 8

(a) Preparation of the polyethylene solution:

|  | G. |
|---|---|
| Hydrogenated castor oil, sold under the trademark "Castorwax M 70" | 12.6 |
| Polyethylene sold under the trademark "DGDA 7401" | 15.0 |
| Cresylic acid | 2.0 |
| Toluene | 4.0 |

(b) Formation of the polyethylene-modified polyurethane:

|  | G. |
|---|---|
| Mixture of 80% of 2,4-toluylene di-isocyanate and 20% of 2,6-toluylene di-isocyanate | 22.4 |
| Toluene | 36.0 |
| Solvent mixture sold under the trademark "Solveso 100" | 5.0 |

After polyurethane formation is completed, 3.0 g. of butanol are added as stabilizer.

Example 9

(a) 50.0 g. of alkali-refined linseed oil, 29.84 g. of polyethylene of the molecular weight 7000, 11.43 g. of glycerol, 8.5 g. of polyoxypropylene of the molecular weight 700, and 0.23 g. of calcium naphthenate are heated at 250° C. under dry nitrogen for one hour while stirring. The polyethylene is completely dissolved. The resulting solution is cooled to 25° C.

(b) A mixture of 36.3 g. of 80% of 2,4-toluylene di-isocyanate and 20% of 2,6-toluylene di-isocyanate is slowly added to 63.7 g. of the composition (a) with stirring, while maintaining the reaction temperature at 60° C. Moisture is excluded by passing a stream of dry nitrogen to the reaction vessel. Heating is continued for about 2 hours at said temperature of 60° C. The viscosity of the resulting product is 50,000 cps. It is especially suitable as coating material.

Example 10

(a) 55.59 g. of the alkali-refined triglyceride of hydroxy oleic acid "DB Oil," 22.0 g. of polyethylene (molecular weight: 7,000), 12.71 g. of glycerol, 9.45 g. of polyoxypropylene (molecular weight: 700), and 0.25 g. of calcium naphthenate are heated at 250° C. under dry nitrogen for one hour while stirring. The polyethylene is completely dissolved. The resulting solution is cooled to 25° C.

(b) 9.1 g. of the mixture of 80% of 2,4-toluylene di-isocyanate and 20% of 2,6-toluylene di-isocyanate are dissolved in 75 g. of toluene. 15.9 g. of the above solution (a) are slowly added thereto within 30 minutes while stirring. Thereby, the temperature increases to 60° C. due to exothermic reaction taking place. The reaction mixture is kept at said temperature for 2 hours. Polyurethane formation is carried out in an atmosphere of dry nitrogen with the exclusion of moisture.

The reaction mixture is cooled and 0.25% of methanol is added. This product is especially suitable as binder for fillers such as sand, cement, etc.

Example 11

(a) 57.02 g. of alkali-refined linseed oil, 20.0 g. of polyethylene (molecular weight: 10,000), 13.22 g. of glycerol, 8.50 g. of polyoxypropylene (molecular weight: 700), and 0.26 g. of calcium naphthenate are heated to 250° C. under dry nitrogen for one hour while stirring. The polyethylene is completely dissolved. The resulting solution is cooled to 25° C.

(b) The procedure is the same as described in Example 10 (b) whereby, however, 16.3 g. of the toluylene di-isocyanates, 28.7 g. of the above solution (a), and 55.0 g. of toluene are reacted. The viscosity of the resulting product is 15.5 seconds. It is especially suitable for concrete coating.

Butanol may also be added to the polyurethane forming reaction in amounts of 0.1% to 1.0%. It serves to remove any traces of water. Before using these products, catalysts, such as cobalt naphthenate, lead naphthenate, zinc 2-ethyl hexanoate, or tertiary organic bases, such as dimethyl ethanolamine, N-methyl piperidine, hexahydro-N,N-dimethyl aniline, and others are added to accelerate cross-linking and thus curing.

Example 12

(a) The solution is the same as described hereinabove in Example 11(a) but polyethylene of a molecular weight of 7000 is used as reaction component.

(b) 9.0 g. of diphenyl methane-4,4'-di-isocyanate are made molten by heating to about 50° C. 80 g. of toluene are added thereto while stirring. 11 g. of the solution (a) are admixed thereto while stirring. The temperature increases due to exothermic reaction to 60° C. The reaction mixture is kept at said temperature for one hour and is cooled to room temperature. Moisture must be excluded during polyurethane formation by carrying out the reaction in a dry nitrogen atmosphere in the absence of moisture. It is especially suitable as binder for sand and other fillers.

Example 13

(a) 53.45 g. of the alkali-refined triglyceride of hydroxy oleic acid "DB Oil," 25.0 g. of polyethylene (molecular weight: 10,000), 12.22 g. of glycerol, 9.08 g. of polyoxypropylene (molecular weight: 700), and 0.25 g. of calcium naphthenate are heated to 25° C. under dry nitrogen for one hour while stirring. The polyethylene is completely dissolved. The resulting solution is cooled at 25° C.

(b) The procedure is the same as described hereinabove in Example 12(b) whereby, however, 20.2 g. of diphenyl methane-4,4'-di-isocyanate, 24.8 g. of the solution (a), and 55.0 g. of toluene are reacted. It is especially suitable for coatings.

Example 14

(a) The solution is the same as prepared according to Example 13(a) but a polyethylene of a molecular weight of 7,000 is used as reaction component.

(b) The procedure is the same as described hereinabove in Example 12(b) whereby, however, 44.9 g. of diphenyl methane-4,4'-di-isocyanate and 55.1 g. of the solution (a) are reacted but no solvent is added. The viscosity of the resulting product is 60,000 cps. It is especially suitable for coatings, as adhesive, and for making elastomers.

It is evident from the preceding examples that, in principle, the process according to the present invention consists in first producing a solution of the polyethylene in a fatty acid compound having free hydroxyl groups and being capable of reacting with poly-isocyanates, and then reacting such polyethylene solution with a poly-isocyanate compound in the presence of a solvent to yield a polyurethane modified by the polyethylene.

Other polyolefins and especially polypropylene may be employed in place of the polyethylene used in the preceding examples. Polybutylene may also be used as admixture to the polyethylene or polypropylene.

As stated above, the resulting solutions are ready to use. If curing driers such as cobalt naphthenate or lead naphthenate are added during polyurethane formation, a coating of the composition according to the present invention, when applied to a surface, becomes non-tacky after 14 minutes to 6 hours depending on the thickness of the layer and the amount and nature of the solvents employed. Without the addition of such curing catalysts non-tackiness is achieved after about 18 hours and the coating is completely cured and hardened after about 4 days. It is also possible to cure and harden the coating by baking for about 30 minutes at 65° C. or for about 15 minutes at 95° C.

It is the preferred procedure to add the solvents to the reaction mixture during reaction with the poly-isocyanate compound because thereby uniform and proper distribution of the solvents throughout the composition is achieved. It is, however, also possible to admix the solvent after reaction is completed. This procedure, however, is recommended only for specific uses of the products. Pigments and other filler materials are preferably added during polyurethane formation in order to assure proper and uniform distribution. They may, however, also be admixed shortly before use, especially when they are employed in highly dispersed form.

As stated hereinabove, the new compositions can be used for many purposes. They may be applied as coatings for practically any type of coating including appliance coatings, tube or pipe coatings, drum or barrel linings, floor coatings, spar varnish, for masonry finishes, for both new construction and refinishing of existing structures made of asphalt, brick, cement, cinder block, concrete, stucco, for highway surfacing, for swimming pools, sewer pipes, dams, reservoirs, and storage tanks, and others more. It is, of course, understood that the solid contents of the compositions are to be varied in accordance with the purpose for which they are used.

The new compositions may be applied by brushing, spraying, flow coating, dipping, roller coating, or trowelling.

The coatings provide exceptional adhesion to cement, concrete, sand, ferrous metals, non-ferrous metals, wood, plastic, glass, leather, rubber, paper, ceramics, and other materials. They exhibit excellent resistance to chemicals, acids, alkalies, soaps, detergents, water, hot and cold, oil, solvents, and other types of aggressive chemicals.

When admixing antiskidding materials such as gravel, sand, cement, lumnite cement, and others, the new compositions provide toppings of high friction texture to highway and other road surfaces where skidding is a hazard. The coatings are resistant to greases, oils, fuels and are weather resistant and wear uniformly to retain non-skid properties. The preferred proportion of antiskidding material to polyethylene-polyurethane compositions according to the preceding examples is between 1:1 and 3:1 and preferably 1.5:1.

The new compositions, when admixed with sand and/or cement can be used for the repair of cracks and breaks in concrete and cement structures such as walls, foundations, roofs, silos, reservoirs, dams, etc. The amounts of sand and/or cement admixed to the compositions according to the present invention as illustrated in the preceding examples may vary. Proportions of sand and/or cement to composition between about 1:1 and about 5:1 are used. Proportions of about 2:1, however, have proved to be especially valuable. As mortar materials, they bring their outstanding adhesive qualities to the quick setting and durable joining of concrete slabs, bricks and blocks where ordinary cement mortar fails.

Concrete pipe coatings are now technically practical with the use of compositions according to the present invention as the interior lining. The resistance of these coatings to corrosive sewage fumes, water and hydrostatic pressure assures long life and maintenance-free service. Admixture of sand or other fillers is possible.

An especially useful application of coating compositions according to the present invention is its use in coating old shingles and sprinkling sand on the coating. This treatment seals and revitalizes worn out asphalt shingles, protecting them against wind and weather for many years. Moreover, the resin also straightens curled and weather-beaten wooden shingles, adding years of waterproof service. The application of the composition is easy. It is brushed onto the shingled roof, followed by a layer of sifted sand. The procedure is repeated for best results. After hardening, the roof is not only watertight but also reflects sun rays and keeps the house cooler in summer. The coating almost completely restores old weather-curled wooden shingles to their original flatness so that they overlap again to prevent entry of rain. Coatings without sand may also be applied to various types of siding.

Compositions according to the present invention have successfully been used in highway construction and repair work. They are employed for bonding up broken and cracked portions of road. Even on prolonged use no deterioration of the patched portions was noted. Before applying the composition, the broken, eroded portion of the concrete surface is cleaned of loose cement and other foreign particles. For this purpose there may also be used mixtures of the compositions with sand, cement, and the like.

Another important use of the compositions according to the present invention is as adhesive binder in the preparation of abrasive paper and cloth as it is used, for instance, for polishing metal parts and the like. While, for instance, an abrasive cloth as made with conventional adhesives can be used for polishing 180 aluminum door handles, a cloth prepared with the adhesive binder according to the present invention is resistant enough to polish 2,000 handles. To produce such abrasive paper or cloth, first a coating is applied thereto, the abrasive is then spread thereon, and the resulting material is dried at 70° C. Thereafter, a topcoat is applied and dried at 70° C.

Another very important use of compositions according to the present invention is their use as electrical insulating material. Coatings made therewith and woven glass, cotton fabric, motor and condenser paper foils and other electrical insulating materials such as paper, silk, rayon, and others impregnated therewith are of special value under humid conditions and at tropical temperatures. Such coatings and impregnations withstand hard wear. For this purpose compositions with a high solid content are preferred.

The compositions can also be used for wire coating, for instance, for enameling of copper wire and the like. The compositions are applied to the wire by the dip method, by means of felt wipers, or by the use of metal wiper discs on horizontal or vertical coating machines. The preferred solid content of such coating compositions is between 40% and 50% while in the disc method compositions of a solid content of 60% to 70% can also be used. Curing is effected at a temperature between 290° C. and 400° C. The resulting wire enamels are of excellent hardness, abrasion resistance, and elasticity. The dielectric strength of wires coated with a composition according to the present invention is reduced from 5080 volts to 3800 volts when the coating has a thickness of 0.001 inch after 30 weeks of immersion in water of 20° C. The wires can be soldered without removal of the coating.

Compositions according to the present invention have proved of value in protecting marine structures, boat hulls and decks, and the like against the action of both salt and fresh water. The coatings can be used with or without filler. Cement admixture has proved to be especially effective. Amounts up to 50% cement can be admixed without diminishing the protective effect of the coatings.

Leather finishes may also be prepared from compositions according to the present invention. These finishes may impart thereto high resistance, and superior flexibility and wear in comparison with the conventional linseed oil varnishes. The solid content of such finishes is rather high and is preferably between about 50% and about 60%.

The new compositions can generally be used as adhesives for bonding many types of material, for instance, vulcanized rubber to vulcanized rubber, leather to leather or rubber, leather and rubber to polyvinyl chloride and other plastics, cork to cork, wood to wood as used in plywood, metal to metal, glass, and other materials, and the like. The resulting bond is resistant to heat, cold, water, perspiration, fats, and oils. The new adhesive is especially suitable for bonding at room temperature and by contact pressure. Shortly before use the composition is diluted with suitable solvents or solvent mixtures, such as aromatic hydrocarbons and aliphatic ketones, and preferably with a mixture of equal volumes of acetone and toluene containing 0.5% to 1.0% of morpholine hexamethylene tetramine, or other ammonia-yielding catalysts. The surfaces to be combined are brushed with the adhesive mixture, exposed to the atmosphere for 10 minutes to 15 minutes for curing, and pressed together. The bond will be ready for light service after 3 hours. Complete curing is achieved after 3 days.

Laminates may also be produced by using the compositions according to the present invention as bonding agents. The resulting laminates are superior to other laminates produced, for instance, with polyester or epoxy resin bonding agents by their high flexural strength, their low water absorption, their excellent resistance to vibration and their superior thermal and electrical insulating properties. Glass-reinforced laminates exhibit high chemical resistance to strong acids and alkalies.

It is also possible to convert the mixtures described hereinabove into rubber-like synthetic elastomers of valuable properties. Such elastomers are quite different from conventional rubber materials because their molecular structures can be varied so as to combine certain desirable properties in the final product.

The elastomers have excellent elongation, high tensile and tear strengths, and high resistance to abrasion and oxidation. Soft grades of these elastomers can be produced with extremely high strength but with the added feature of high abrasion resistance. Harder grades provide a structural material which combines high hardness and elasticity with other desirable properties.

A remarkable characteristic of polyethylene-polyurethane rubber is that its tear strength increases with its hardness. Likewise its abrasion resistance increases with its hardness and its excellent long-term wear resistance maintains a high degree of dimensional stability because less than 1% moisture is absorbed.

For optimum properties a high curing temperature is recommended. The curing time is as follows:

At, ° C.
    80 _____ days__  5–7
    100–120 _____ hours__    6
    130 _____ min__  20–35
    150 _____ min__  10–29

At low temperatures, the new elastomer stiffens but does not become brittle until the temperature has decreased to about −70° C. Stiffening starts at about −22° C. to −30° C.

Polyethylene-polyurethane elastomers according to the present invention are produced by using two techniques:

(1) The casting or prepolymer method involves first the preparation of a liquid polyethylene-di-isocyanate reaction product containing reactive isocyanate groups followed by curing with a cross-linking agent. An excess of about 35% to 50% of toluylene di-isocyanate than required is added in the first step, or the equivalent amount of other polyisocyanates.

(2) Preparation of a stable crude elastomer which can be processed on rubber equipment and cured with the addition of more polyisocyanate.

In the following examples the prepolymer according to the first method is prepared as follows:

A fatty acid compound containing free hydroxyl groups, such as a castor oil polyol ester is charged to a tree-necked glass flask provided with a stirrer, thermometer, and air drying apparatus. The castor oil polyol ester is pre-heated to 95–125° C. and the polyethylene is added. From 2.4–2.6 equivalents of toluylene di-isocyanate per equivalent of polyol ester and polyethylene are then added within a period of 30 minutes to 45 minutes. The rate of addition is such that exothermic reaction at about 80° C. is maintained. After all the toluylene di-isocyanate has been added, the reaction mixture is kept at 80–95° C. for 30 more minutes. The reaction product is a heavy viscous liquid.

In the second reaction step the prepolymer is cured as follows: The prepolymer of step 1 and a sufficient amount of curing polyol ester or polyalcohol are placed separately in a vacuum oven and are freed of gas bubbles by heating to 50–70° C. for 10–20 minutes at a vacuum of 5 mm. Hg. The degassed polyol ester is then added to the prepolymer to effect curing. The excess of isocyanate groups in the prepolymer is determined and the value is used for calculating the amount of polyhydric alcohol to be added for curing. After thoroughly mixing the reactants, the mixture is poured into heated, silicone-treated molds and is cured at about 95° C. for 2 hours. The resulting reaction product represents a rubber-like elastomer.

The following examples serve to illustrate the preparation of elastomers of varying hardness according to the present invention without, however, limiting the same thereto. The procedure is followed as described hereinabove. Therefore, only the amounts of reactants are given and the uses of the resulting elastomers. "TDI 80/20" in said examples indicates the mixture of 80% of 2,4-toluylene di-isocyanate and 20% of 2,6-toluylene di-isocyanate.

Example 15

(a) Preparation of prepolymer:
    Castor oil (molecular weight: 9925) ___g__ 190.68
    Polyethylene _____g__  90.80
    TDI 80/20 _____g__ 172.52
(b) Curing to elastomer:
    Prepolymer _____g__ 272.40
    "Polycin 52" (plasticizer resulting from complete oxidation of castor oil; molecular weight: 475) _____g__ 181.60
    Properties of resulting elastomer:
    Tensile strength _____p.s.i__ 1275

Example 15—Continued

Elongation _____ percent__ 150
100% modulus _____ 900
Hardness Shore A _____ 80

Uses: gears, drawing and press dies, molds, pump stators and impellers.

Example 16

(a) Preparation of prepolymer:
"Polycin 59" (polyester resin; polymerized castor oil; molecular weight: 555) ____g__ 138.47
Polyethylene (molecular weight: 1200) _g__ 90.80
TDI 80/20 _____ g__ 224.73

(b) Curing to elastomer:
Prepolymer _____ g__ 220.19
"Polycin 52" (molecular weight: 475) __g__ 233.81
Properties of resulting elastomer:
Tensile strength _____ p.s.i__ 1050
Elongation _____ percent__ 270
100% modulus _____ 200
Hardness Shore A _____ 50

Uses: gears, drawing and press dies, molds, pump stators and impellers.

Example 17

(a) Preparation of prepolymer:
"Polycin 60" (polyester resin; molecular weight: 580) _____ g__ 136.20
Polyethylene _____ g__ 102.15
TDI 80/20 _____ g__ 215.65

(b) Curing to elastomer:
Prepolymer _____ g__ 287.16
"Polycin 51" (plasticizer resulting from complete oxidation of castor oil; molecular weight: 430) _____ g__ 87.39
"Polycin 52" (molecular weight: 475) __g__ 79.45
Properties of resulting elastomer:
Tensile strength _____ p.s.i__ 2750
Elongation _____ percent__ 175
100% modulus _____ 2100
Hardness Shore A _____ 95

Uses: potting and encapsulating compositions, rigid gaskets, shock absorbers, heel lifts.

Example 18

(a) Preparation of prepolymer:
"Polycin 59" (molecular weight: 555) __g__ 138.47
Polyethylene _____ g__ 90.80
TDI 80/20 _____ g__ 224.73

(b) Curing to elastomer:
Prepolymer _____ g__ 279.21
"Polycin 51" (molecular weight: 430) __g__ 174.79
Properties of resulting elastomer:
Tensile strength _____ p.s.i__ 875
Elongation _____ percent__ 400
100% modulus _____ 350
Hardness Shore A _____ 40

Uses: adhesives, binders, sealants, potting compounds, laminations.

Example 19

(a) Preparation of prepolymer:
Castor oil "DB–O" _____ g__ 190.68
Polyethylene _____ g__ 90.80
TDI 80/20 _____ g__ 172.52

(b) Curing to elastomer:
Prepolymer _____ g__ 310.31
"Polycin 51" (molecular weight: 430) __g__ 143.69
Properties of resulting elastomer:
Tensile strength _____ p.s.i__ 300
Elongation _____ percent__ 210
100% modulus _____ 250
Hardness Shore A _____ 45

Uses: printing rollers, shock absorbers.

Example 20

(a) Preparation of prepolymer:
"Polycin 59" (molecular weight: 555) __g__ 138.47
Polyethylene (molecular weight: 17000) _____ g__ 90.80
TDI 80/20 _____ g__ 224.73

(b) Curing to elastomer:
Prepolymer _____ g__ 279.21
"Polycin 51" (molecular weight: 430) __g__ 174.79
Properties of resulting elastomer:
Tensile strength _____ p.s.i__ 925
Elongation _____ percent__ 330
100% modulus _____ 400
Hardness Shore A _____ 40

Example 21

According to another embodiment of the present invention elastomers are prepared as follows:

(a) The polyethylene-modified fatty acid ester with free hydroxyl groups is prepared from the following components as described hereinafter:

G.
Castor Oil "DB Oil" and polyethylene (polyethylene content as desired between 10% and 50%) ____ 1640
Ethylene glycol _____ 40
Di-ethylene glycol _____ 80
Calcium naphthenate _____ 1
Oxidized aluminum foil as catalyst _____ 1

The mixture of these ingredients is slowly heated to 150° C. and kept at said temperature for about 10 minutes whereby care must be taken that overheating due to the somewhat exothermic reation is avoided. The resulting solution is designated as "DB Oil modified."

(b) Preparation of the prepolymer: G.
DB Oil modified (with 10% to 50% of polyethylene) _____ 1761
Polyether triol sold under the trademark "LHT 240" _____ 40
Mixture of 80% of 2,4-toluylene diisocyanate and 20% and 2,6-toluylene diisocyanate ___ 570
Diphenyl methane-4,4'-di-isocyanate designated hereinafter as "MDI 300" _____ 970

The polyether diol, the toluylene di-isocyanate mixture and the diphenyl methane-4,4'-di-isocyanate are heated to about 82° C. The DB Oil modified is then added slowly and gradually thereto whereby the temperature increases. If necessary, cooling is required to avoid overheating. When the temperature has increased to about 110° C. it starts to decrease. If not, the mixture is cooled to a temperature of about 80° C. It is then filled into cans. The tacky mass therein is covered with hot paraffin wax to exclude moisture and the resulting prepolymer may be stored, if desired.

(c) Cross-linking and curing agent (composed of): G.
Polycin 52 _____ 9.0
Polycin 53 _____ 2.7
Resorcinol _____ 0.4
Prepolymerized ethyl hexyl acrylate _____ 0.2

(d) Preparation of coating or film
Prepolymer _____ 30.0
Cross-linking agent _____ 12.3

The prepolymer and the cross-linking agent are thoroughly and quickly mixed for about two minutes and are applied to the object to be coated or to a surface for film casting. After applying the coating or film, the coated article or the film on its casting surface are placed in a drying oven and are dried at 80° C. to 95° C. for about 5 minutes to completely remove the air bubbles.

The coating or film sets at about 100° C. within 10 minutes or it gels at room temperature after aging for 20 hours. Complete curing is achieved either slowly at room temperature within several months or at about 110° C. within 20 minutes. The resulting coating adheres firmly to the coated surface while the film may be stripped from its casting surface.

The following examples describe different types of elastomers useful for coatings, for film formation, as binding agents, and for other purposes as stated hereinabove. In these examples the modified DB Oil is the same product as the solution of Example 21(a) whereby, however, the amount of polyethylene may vary.

The prepolymer and the curing agent are prepared and combined in the same manner as described in Example 21.

Example 22

(b) Prepolymer: G.
- MDI 300 _____ 38.16
- Modified DB Oil with about 23% of polyethylene _____ 46.84
- Toluene _____ 15.00

(c) Curing Agent:
- DB Oil (castor oil)

(d) Preparation of elastomer:
- Prepolymer _____ 60.00
- Reactive curing agent _____ 40.00

Example 23

(b) Prepolymer: G.
- Modified DB Oil with 30% of polyethylene __ 43.0
- MDI 300 _____ 37.5
- Toluene _____ 20.0

(c) Reactive curing agent:
- DB Oil _____ 87.9
- "Nuocure 28" _____ 2.1

(d) Preparation of elastomer:
- Prepolymer _____ 67.7
- Reactive curing agent _____ 32.2

Example 24

(b) Prepolymer: G.
- MDI 300 _____ 37.5
- Modified DB Oil with 30% polyethylene ____ 43.0
- Toluene _____ 19.5

(c) Reactive curing agent:
- DB Oil _____ 72.7
- Sodium lactate (anhydrous) _____ 9.1
- Lactic acid (anhydrous) _____ 18.2

(d) Preparation of elastomer:
- Prepolymer _____ 73.2
- Reactive curing agent_____ 26.8

Yields a tough and hard film.

Example 25

(b) Prepolymer: G.
- MDI 300 _____ 62.5
- Diethylene glycol _____ 20.8
- Toluene _____ 16.7

(c) Reactive curing agent.
- Modified DB Oil with 30% of polyethylene.

(d) Preparation of elastomer:
- Preploymer _____ 75.0
- Reactive curing agent _____ 25.0

This example describes a process wherein the prepolymer does not contain polyethylene but wherein the polyethylene is present in the curing agent, i.e. in the hydroxyl group-containing castor oil.

Example 26

(b) Prepolymer: G.
- MDI 300 _____ 42.65
- Modified DB Oil with 30% of polyethylene__ 52.35
- Toluene _____ 5.00

(c) Reactive curing agent:
- Estinox 140.

(d) Preparation of elastomer:
- Prepolymer _____ 73.2
- Reactive curing agent _____ 26.8

This composition yields a highly elastic film on casting.

Example 27

(b) Prepolymer: G.
- TDI 80/20 _____ 57.65
- Diethylene glycol _____ 15.37
- Ethyl hexyl acrylate prepolymerized to a heavy sirup _____ 11.53
- Benzoyl peroxide _____ 0.08
- Toluene _____ 15.57

(c) Reactive curing agent:
- Modified DB Oil with 30% of polyethylene.

(d) Preparation of elastomer:
- Prepolymer _____ 75.0
- Reactive curing agent _____ 25.0

Example 28

(b) Prepolymer: G.
- MDI 300 _____ 37.5
- Modified DB Oil with 5% of polyethylene ____ 43.0
- Toluene _____ 19.5

(c) Reactive curing agent:
- Polycin 53 _____ 50.0
- Decamethylene glycol _____ 50.0

(d) Preparation of elastomer:
- Prepolymer _____ 68.2
- Reactive curing agent _____ 31.8

This composition yields a water-clear film.

Example 29

(b) Prepolymer: G.
- MDI 300 _____ 37.5
- Modified DB Oil with 25% of polyethylene __ 43.0
- Toluene _____ 19.5

(c) Reactive curing agent:
- Flexricin 15.

(d) Preparation of elastomer:
- Prepolymer _____ 68.2
- Reactive curing agent _____ 31.8

Example 30

(b) Prepolymer: G.
- MDI 300 _____ 37.5
- Modified DB Oil with 25% polyethylene _____ 43.0
- Toluene _____ 19.5

(c) Reactive curing agent:
- Phenol-formaldehyde resin _____ 31.25
- DB Oil _____ 68.75

(d) Preparation of elastomer:
- Polymer _____ 65.2
- Reactive curing agent _____ 34.8

In general elastomers obtained in this manner are distinguished by the following properties:

Tensile and elongation strength is excellent, ranging from 4,000 p.s.i. to 8,000 p.s.i. and 450% to 1200% elongation, depending upon the life.

Softer grades have lower tensile modulus values than the harder types. Elongation set varies from 5–10% in the softest grade to 35–45% in the hardest grade.

The tear strength increases as the hardness value increases, the ranges being 280–340 p.s.i., 450–550 p.s.i., 560–750 p.s.i., 550–800 p.s.i. for the above given examples.

Polyethylene-polyurethane rubber, which has a hardness value 83–96 determined on the durometer, has given 8 to 10 times the wear of natural and other synthetic rubber materials.

The rebound elasticity of all types of polyethylene-polyurethane rubber is excellent, ranging from 45–80. This material is unique in its combination of hardness, elasticity, and elongation. Their oxygen resistance is also excellent. They can be readily cast in molds with difficult design patterns such as undercuts, slots, tapers, treads, and integral insert. They have found to be of particular use as shock absorbent pads under machinery where vibration or impact shock is a problem, for airhammer handles, for suspension bearings on heavy earth moving equipment and farm machinery, and for many other purposes.

The coating compositions according to the present invention, i.e., the polyethylene- or polypropylene-modified polyurethane products have a number of advantages over known compositions of the polyurethane-polyester type, over epoxy ester, and over amine-cured epoxyester resins. For instance, the drying time is reduced to at least half the drying time of the polyurethane-polyester, the hardness is also considerably improved. For instance, after seven days the hardness is about 80% better than the hardness of a polyurethane-polyester film, about 400% better than that of an epoxyester film, and 200% better than that of an amine-cured epoxyester film. The gloss of films and foils according to the present invention is also improved. For instance, a polyurethane-polyester film shows about 90% reflectance, an epoxy ester film about 85% reflectance, and an amine-cured epoxy ester film about 75% reflectance, while a film made according to the present invention from a polyethylene-polyurethane product has 95% reflectance.

The flexibility of films and foils made of compositions according to the present invention is also far superior to the flexibility of films or foils made from the above mentioned known resins. The impact resistance is superior to that of said known resins. The abrasion resistance is about 80% to 100% better than that of a polyurethane-polyester film and about 550% better than that of an epoxy ester film and about 1000% better than that of an amine-cured epoxy ester film. Steel plates coated with compositions according to the present invention and with compositions containing polyurethane-polyester base, epoxy ester resins, or amine-cured epoxy ester resins were immersed in water at room temperature. The water resistance of the new coatings, in all instances, was considerably better than that of the known resins. While, for instance, an epoxy ester film and an amine-cured epoxy ester resin coating were resistant to water only for 15 days, the coatings according to the present invention were resistant for at least 100 days and ordinarily for 150 days to 185 days. Polyurethane-polyester coatings and epoxy ester coatings showed a very low resistance to toluene. Coatings according to the present invention, in contrast thereto, when immersed in toluene were resistant for about 145 days while the polyurethane-polyester film was resistant for 5 days to 13 days and the epoxy ester coatings for 2 days only.

It may be mentioned that the new polyurethane products modified by a polymer of an olefin are compatible with a large number of other compounds and yield therewith homogeneous solutions or mixtures. Such other compounds are, for instance, the following:

| Compound | Percent to be admixed to new polyurethane |
|---|---|
| Anhydrous lanolin | 25–75 |
| "Armowax" (synthetic amide wax derived from fatty acids) | 25–75 |
| Beeswax | 25–75 |
| Castorwax (hydrogenated castor oil) | about 75 |
| "Ester Gum 8L" (hard glycerol ester of resin) | 25–75 |
| "Flexalyn" (diethylene glycol ester of resin acid No. 12) | 25–75 |
| Microcrystalline wax | 25–75 |
| Mineral oil (as diluting solvent) | 25–75 |
| Paraffin | 25–75 |
| "Pentalyn H" (penacrythritol ester of hydrogenated resin acid No. 18) | 25–75 |
| Petrolatum | 25–75 |
| "Piccolyte S–100" (polymerized petroleum resin) | 25–75 |
| "Piccopale 100" (thermoplastic, methylated paraffinic chain hydrocarbon resin of petroleum origin) | 25–75 |
| "Polybutene 32" | 25–75 |
| "Staybelite" (thermoplastic hydrogenated wood resin) | 25–75 |
| "Staybelite Ester 10" (glycerol ester of hydrogenated resin acid No. 10) | 25–75 |
| Stearic acid | 25–75 |
| "Vistac No. I" (synthetic hydrocarbon polymers) | 25–75 |
| "Vistac A" (synthetic hydrocarbon polymers) | 25–75 |
| "Aroclor 1248" (chlorinated biphenyl and polyphenyls) of Monsanto Chemical Corp. | 75–90 |
| "Aroclor 5460" (chlorinated biphenyl and polyphenyls) | 75–90 |
| "Elastex 10 P" (diisooctylphthalate plasticizer) | 75–90 |

As stated above, the new composition has proved to be of special value as soil stabilizer, for instance for preparing road bases or sub-bases. The resulting thickness of the layers may vary. Layers of a thickness between about 3 inches and about 8 inches have proved of sufficient strength and stabilization power.

The heretofore used bases of stone pitching or hard core consisting of pieces of broken rock of about 9 inches or more in size were packed closely together by hand and the interstices of the surface were filled with a heavy roller. These road bases can advantageously be replaced by mixtures of sand and the resin compositions according to the present invention, for instance, those of Examples 9 to 14 in a ratio of about 28:1 to about 30:1. The mixture of sand and resin is spread over the earth surface and rolled with a heavy roller. The thickness of this base and its composition depend largely upon the traffic conditions.

Bases in which aggregate and sand are held together with the polyolefin-modified polyurethane resin according to the present invention have better load spreading properties than the conventional bases with no binding agent. As has been found, the thickness of the base layer can be reduced when using the binding agent of the present invention in comparison to that of conventional base layers.

The base layer may advantageously be surfaced by a surface layer or wearing course which consists of sand and the resinous binding agent according to the present invention. The preferred ratio of sand to resin is 10:1. Such a surfacing layer may not only be used in new road construction but may also be used for resurfacing and maintaining existing roads. Fine aggregate can be incorporated into the sand-resin mixture to produce a closer-textured material.

All the road surfaces made with the polyolefin-modified polyurethane resins according to the present invention have a high resistance to skidding when dry. When wet, this resistance to skidding depends on the texture of the road surface, i.e., on the aggregate and its particle size. Surfacing layers containing a high proportion of fine aggregate are denser and more impermeable and generally more durable than the macadam type of surfacing. For roads carrying heavy traffic, the more viscous binders are used and the material is spread, while still warm, within a few hours of mixing. For light-trafficked roads sand mixed with low viscosity binder may be used. Such mixtures can be transported by truck and laid within 5 hours to 10 hours after mixing.

Special patching compositions for patching, for instance, cracks in cement floors or driveways, for bonding prestressed and precast concrete slabs used in highway construction, for water proofing, coating of steel or wooden tanks, steel pipes, swimming pools, etc. are composed, for instance, of 12 parts to 20 parts of Portland cement and 1 part of the polyethylene-modified polyurethane resins of Examples 9 to 14 with or without the addition of further solvents such as toluene or xylene. Such compositions with 12 parts to 20 parts of cement to 0.5 part to 1 part of the resin with 0.15 part to 3 parts of solvent have the following properties:

Hardness, pencil hardness test _____ 94.
Drying time _____ 40 minutes.
Temperature resistance _____ 250° C.
Adhesion to glass _____ Excellent.
Adhesion to lead-tin _____ Excellent.
Adhesion to steel-aluminum _____ Excellent.
Impact resistance _____ 160 lbs./sq. in.

Sand in various amounts may also be admixed to compositions used for making floors of improved wear and skid resistance. Or the sand may be strewn evenly over the floor or surface. Excess sand is removed after hardening of the resin.

Of course, many changes and variations in the fatty acid derivatives, fats and oils, in the polyalcohols used for transesterification, in the polyolefins, in the diisocyanates and polyisocyanates, in the transesterification and curing catalysts, in the solvents and stabilizers, in the pigments and filler materials, in the proportions of said components, the reaction conditions, temperature and duration, in the application and use of the new polyurethane products and the like may be made by those skilled in the art in accordance with the principles set forth herein and in the claims annexed hereto.

I claim:

1. In a process of producing a polyurethane resin modified by a polymer of an olefin, the steps which comprise heating a polymer of a monoolefin having 2 to 4 carbon atoms with a fatty acid ester of a polyhydric alcohol, said ester having at least one free hydroxyl group, to a temperature of at least 80° C. until said polymer is substantially completely dissolved, cooling the resulting mixture, gradually adding thereto a reactive, polyurethane-forming polyisocyanate at a temperature between about 40° C. and about 90° C., and keeping the mixture at said temperature until polyurethane formation is completed, said polyurethane formation being carried out in a substantially moisture-free atmosphere.

2. In a process of producing a polyurethane resin modified by a polymer of an olefin, the steps which comprise heating polyethylene with a fatty acid ester of a polyhydric alcohol, said ester having at least one free hydroxyl group, to a temperature between about 200° C. and about 500° C. until the polyethylene is substantially completely dissolved, cooling the resulting mixture, gradually adding thereto a reactive, polyurethane-forming polyisocyanate at a temperature between about 40° C. and about 90° C., and keeping the mixture at said temperature until polyurethane formation is completed, said polyurethane formation being carried out in a substantially moisture-free atmosphere.

3. In a process of producing a polyurethane resin modified by a polymer of an olefin, the steps which comprise reacting a fatty acid glyceride with a polyhydric alcohol to form a fatty acid ester having a free hydroxyl group, heating said ester with polyethylene to a temperature of about 250° C. until the polyethylene is substantially completely dissolved, cooling the resulting mixture to a temperature below 100° C., gradually adding thereto toluylene diisocyanate and keeping the mixture at a temperature between about 40° C. and about 90° C. until polyurethane formation is completed, said polyethylene dissolving step and said polyurethane formation step being carried out in a substantially moisture-free atmosphere.

4. In a process of producing a polyurethane resin modified by a polymer of an olefin, the steps which comprise heating a mixture of a fatty acid glyceride, a polyhydric alcohol, and a polymer of a monoolefin having 2 to 4 carbon atoms to a temperature of at least 120° C. until transesterification of the fatty acid glyceride with formation of a fatty acid ester having at least one free hydroxyl group is effected and said polymer is substantially completely dissolved in the resulting transesterified fatty acid ester, cooling the resulting mixture to a temperature below 100° C., gradually adding thereto a reactive, polyurethane-forming polyisocyanate and keeping the mixture at a temperature between about 40° C. and about 90° C. until polyurethane formation is completed, said steps being carried out in a substantially moisture-free atmosphere.

5. In a process of producing a polyurethane resin modified by a polymer of an olefin, the steps which comprise heating a mixture of a fatty acid glyceride, a polyethylene glycol, and polyethylene to a temperature between about 120° C. and about 500° C. until transesterification of the fatty acid glyceride with formation of a fatty acid ester having at least one free hydroxyl group is effected and the polyethylene is substantially completely dissolved in the resulting transesterified fatty acid ester, cooling the resulting mixture to a temperature below 100° C., gradually adding thereto a reactive, polyurethane-forming polyisocyanate, and keeping the mixture at a temperature between about 40° C. and about 90° C. until polyurethane formation is completed, said steps being carried out in a substantially moisture-free atmosphere.

6. In a process of producing a polyurethane resin modified by a polymer of an olefin, the steps which comprise heating a polymer of a monoolefin having 2 to 4 carbon atoms with a fatty acid ester of a polyhydric alcohol, said ester having at least one free hydroxyl group, to a temperature of at least 120° C. until said polymer is substantially completely dissolved, cooling the resulting mixture to a temperature below 100° C., gradually adding thereto a reactive polyurethane-forming polyisocyanate and keeping the mixture at a temperature between about 40° C. and about 90° C. until polyurethane formation is completed, and adding to the resulting mixture a polyurethane stabilizing alcohol, said steps being carried out in a substantially moisture-free atmosphere.

7. In a process of producing a polyurethane resin modified by a polymer of an olefin, the steps which comprise heating a polymer of a monoolefin having 2 to 4 carbon atoms with a fatty acid ester of a polyhydric alcohol, said ester having at least one free hydroxyl group, to a temperature of at least 120° C. until said polymer is substantially completely dissolved, cooling the resulting mixture to a temperature below 100° C., gradually adding thereto a reactive, polyurethane-forming polyisocyanate, keeping the mixture at a temperature between about 40° C. and about 90° C. until polyurethane formation is completed, and adding to the resulting mixture a polyurethane stabilizing alcohol, and a naphthenate drier for unsaturated fatty oils, said reaction steps being carried out in a substantially moisture-free atmosphere.

8. The resinous polyurethane product modified by a polymer of an olefin obtained by heating a polymer of a monoolefin having 2 to 4 carbon atoms with a fatty acid ester having at least one free hydroxyl group, to a temperature of at least 120° C. until said polymer is substantially completely dissolved, cooling the resulting mixture to a temperature below 100° C., gradually adding thereto a reactive polyurethane-forming polyisocyanate, and keeping the mixture at a temperature between about 40° C. and about 90° C. until polyurethane formation is completed, said reaction steps being carried out in a substantially moisture-free atmosphere.

9. The coating composition comprising the resinous polyurethane product modified by a polymer of an olefin obtained by heating a polymer of a monoolefin having 2 to 4 carbon atoms with a fatty acid ester having at least one free hydroxyl group, to a temperature of at least 120° C. until said polymer is substantially completely dissolved, cooling the resulting mixture to a temperature below 100° C., gradually adding thereto a reactive polyurethane-forming polyisocyanate, and keeping the mixture at a temperature between about 40° C. and about 90° C. until polyurethane formation is completed, said reaction steps being carried out in a substantially moisture-free atmosphere, said resinous polyurethane product being dissolved in an organic solvent.

10. A composition for the construction of road surfaces and for soil stabilization comprising sand and, as binding agent, the polyolefin-modified polyurethane of claim 8 in the proportion between about 3:1 and about 30:1.

11. A building construction and patching material comprising Portland cement and the polyolefin-modified polyurethane of claim 8.

12. The process according to claim 1, wherein an inert diluting solvent is added together with the reactive, polyurethane-forming polyisocyanate.

13. The process according to claim 12, wherein the inert diluting solvent is an aromatic hydrocarbon.

14. The process according to claim 1, wherein the reactive, polyurethane-forming polyisocyanate is toluylene diisocyanate.

15. The process according to claim 1, wherein the fatty acid ester is a hydroxylated fatty acid ester.

16. The process according to claim 4, wherein heating a mixture of a fatty acid glyceride, a polyhydric alcohol, and a polymer of a monoolefin having 2 to 4 carbon atoms to a temperature of at least 120° C. is carried out in the presence of a transesterification catalyst.

17. The solution of a polyolefin in a fatty acid ester compound having at least one free hydroxyl group in its molecule, said compound being an ester of a fatty acid with at least fourteen carbon atoms, said polyolefin being a polymer of a monoolefin having two to four carbon atoms, the amount of the polyolefin in said solution not exceeding 60%.

References Cited

UNITED STATES PATENTS

| | | | |
|---|---|---|---|
| 3,031,422 | 4/1962 | Posnansky | 260—23 |
| 3,057,810 | 10/1962 | Guillet et al. | 260—23 |
| 3,272,890 | 9/1966 | O'Leary | 260—859 |
| 3,305,503 | 2/1967 | Russell | 260—28.5 |
| 3,310,604 | 3/1967 | Steingiser et al. | 260—859 |
| 3,351,676 | 11/1967 | Saunders et al. | 260—859 |

DONALD E. CZAJA, *Primary Examiner.*

R. A. WHITE, *Assistant Examiner.*

U.S. Cl. X.R.

161—190; 260—27, 4, 28.5, 33.6, 41, 859; 117—161, 232; 94—22; 252—8.57; 51—298; 156—331